US011326809B1

(12) United States Patent
Tsai et al.

(10) Patent No.: US 11,326,809 B1
(45) Date of Patent: May 10, 2022

(54) WATER HEATER MIXING VALVE FAULT DETECTION (71) Applicant: Haier US Appliance Solutions, Inc., Wilmington, DE (US)

(72) Inventors: Craig Iung-Pei Tsai, Louisville, KY (US); Paul Goodjohn, Crestwood, KY (US); Andrew L. Reder, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/115,994

(22) Filed: Dec. 9, 2020

(51) Int. Cl.
*F24H 9/20* (2022.01)
*F24D 19/10* (2006.01)
*F16K 37/00* (2006.01)
*G05D 23/13* (2006.01)

(52) U.S. Cl.
CPC ....... *F24H 9/2021* (2013.01); *F16K 37/0083* (2013.01); *F16K 37/0091* (2013.01); *F24D 19/1051* (2013.01); *F24H 9/2007* (2013.01); *G05D 23/134* (2013.01)

(58) Field of Classification Search
CPC ............. F16K 37/0083; F16K 37/0091; F24H 9/2007; F24H 9/2021; G05D 23/134; F24D 19/1051
See application file for complete search history.

(56) References Cited

U.S. PATENT DOCUMENTS

| 9,244,466 | B2 | 1/2016 | DePlessis et al. | |
| 9,310,813 | B2 | 4/2016 | Farris et al. | |
| 10,274,104 | B2 | 4/2019 | Farris et al. | |
| 2010/0209084 | A1* | 8/2010 | Nelson | F24D 19/1054 392/465 |
| 2015/0013622 | A1* | 1/2015 | Farris | G05D 23/1366 122/14.1 |
| 2016/0313029 | A1* | 10/2016 | Ward | G05D 23/1393 |
| 2017/0122458 | A1* | 5/2017 | Farris | G05D 23/1393 |
| 2018/0274793 | A1* | 9/2018 | Shaffer | G05D 23/1393 |

FOREIGN PATENT DOCUMENTS

JP    5842576 B2    1/2016

* cited by examiner

*Primary Examiner* — Atif H Chaudry
(74) *Attorney, Agent, or Firm* — Dority & Manning, P.A.

(57) ABSTRACT

A water heater appliance includes a cold water conduit and a hot water conduit. The water heater appliance also includes a mixing valve and a controller. The controller may be configured for and/or methods of operating the water heater appliance may include detecting a start of a flow event from the water heater appliance and detecting a water temperature in the mixed water conduit of the water heater that is outside of tolerance limits after detecting the start of the flow event. The controller may be further configured for and/or the method may further include verifying that the flow event has not ended after detecting the water temperature in the mixed water conduit is outside of the tolerance limits. After verifying that the flow event has not ended, a count is added to a fault counter.

16 Claims, 4 Drawing Sheets

WATER HEATER MIXING VALVE FAULT DETECTION

FIELD OF THE INVENTION

The present subject matter relates generally to water heater appliances and methods for detecting a fault in a mixing valve of water heater appliances.

BACKGROUND OF THE INVENTION

Certain water heater appliances include a tank therein. Heating elements, such as gas burners, electric resistance elements, or induction elements, heat water within the tank during operation of such water heater appliances. In particular, the heating elements generally heat water within the tank to a predetermined temperature. The predetermined temperature is generally selected such that heated water within the tank is suitable for showering, washing hands, etc.

During operation, relatively cool water flows into the tank, and the heating elements operate to heat such water to the predetermined temperature. Thus, the volume of heated water available at the predetermined temperature is generally limited to the volume of the tank. Accordingly, water heater appliances are sold in various sizes to permit consumers to select a proper tank volume and provide sufficient heated water. However, large water heater appliances with large tanks occupy large amount of space within a residence or business. In certain buildings, space is limited and/or expensive. Thus, utilizing large water heater appliances can be impractical and/or prohibitively expensive despite needing large volumes of heated water.

To provide relatively large volumes of heated water from relatively small tanks, certain water heater appliances utilize a mixing valve. The mixing valve permits water within the water heater's tank to be stored at relatively high temperatures. The mixing valve mixes such high temperature water with relatively cool water in order to bring the temperature of such water down to suitable and/or more usable temperatures. Thus, such water heater appliance can provide relatively large volumes of heated water without requiring large tanks.

Mixing valves in such water heater appliances may, at times, experience a fault condition, such as the valve being stuck in a certain position or otherwise failing to respond to a call to adjust the flow from the water heater appliance.

Accordingly, a water heater appliance having a mixing valve that includes features for determining when the mixing valve is not operating as intended would be useful.

BRIEF DESCRIPTION OF THE INVENTION

Aspects and advantages of the invention will be set forth in part in the following description, or may be apparent from the description, or may be learned through practice of the invention.

In one exemplary embodiment, a method for operating a water heater appliance is provided. The water heater appliance includes a cold water conduit providing a flow of water to the water heater appliance, a hot water conduit providing a flow of water from the water heater appliance, a mixing valve in direct fluid communication with the cold water conduit and the hot water conduit, and a mixed water conduit downstream of the mixing valve. The method includes detecting a start of a flow event from the water heater appliance and detecting a water temperature in the mixed water conduit of the water heater that is outside of tolerance limits after detecting the start of the flow event. The method further includes verifying that the flow event has not ended after detecting the water temperature in the mixed water conduit is outside of the tolerance limits. After verifying that the flow event has not ended, the method includes adding a count to a fault counter.

In another exemplary embodiment, a water heater appliance is provided. The water heater appliance includes a cold water conduit providing a flow of water to the water heater appliance and a hot water conduit providing a flow of water from the water heater appliance. The water heater appliance also includes a mixing valve in direct fluid communication with the cold water conduit and the hot water conduit with a mixed water conduit downstream of the mixing valve. The water heater appliance further includes a controller. The controller is configured for detecting a start of a flow event from the water heater appliance and detecting a water temperature in the mixed water conduit of the water heater that is outside of tolerance limits after detecting the start of the flow event. The controller is further configured for verifying that the flow event has not ended after detecting the water temperature in the mixed water conduit is outside of the tolerance limits. After verifying that the flow event has not ended, the controller is configured for adding a count to a fault counter.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. The detailed description uses numerical and letter designations to refer to features in the drawings. Like or similar designations in the drawings and description have been used to refer to like or similar parts of the disclosure. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 1:
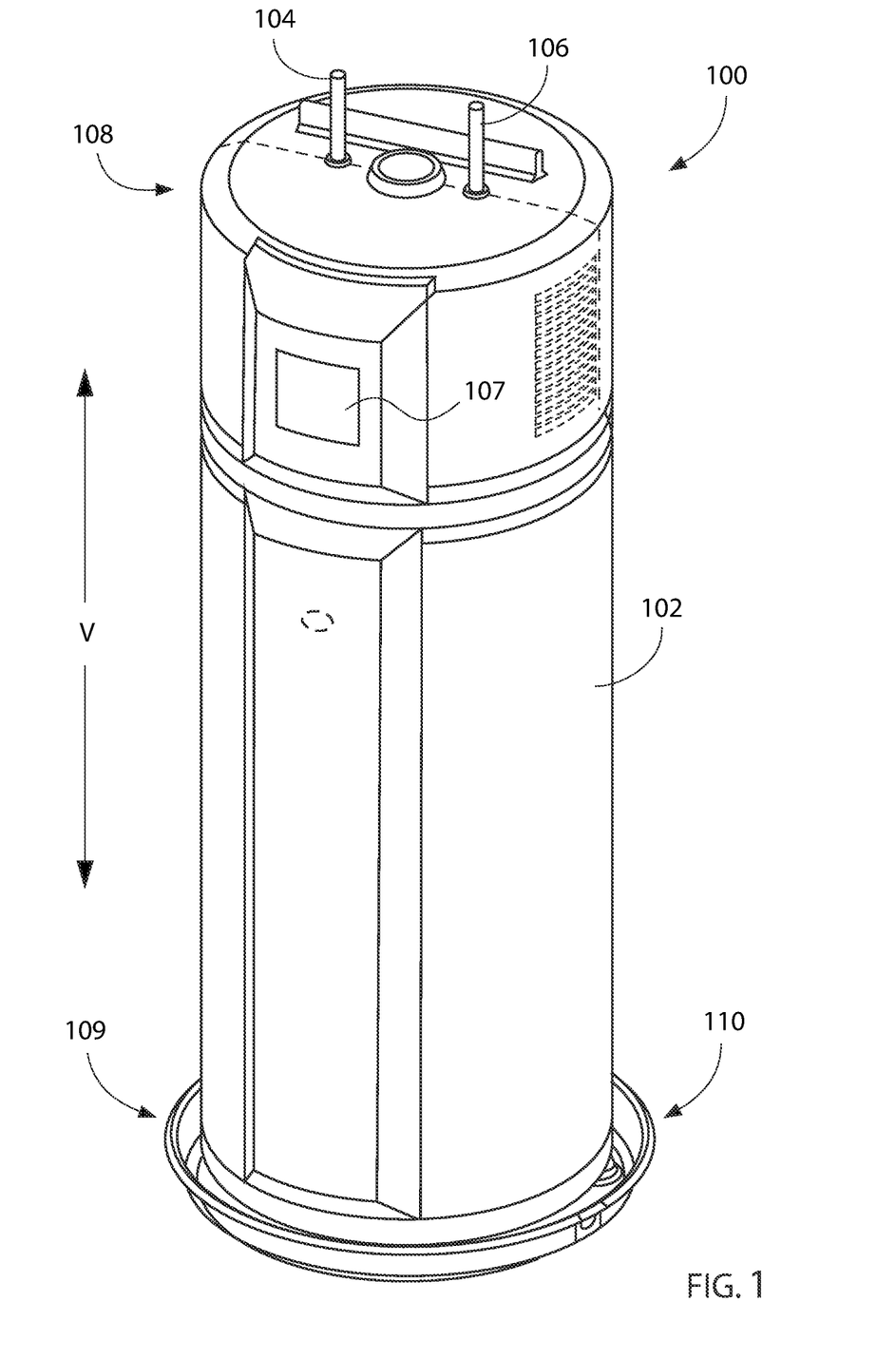
FIG. 1 provides a perspective view of a water heater appliance according to an exemplary embodiment of the present subject matter.

FIG. 1 provides a perspective view of a water heater appliance 100 according to an exemplary embodiment of the present subject matter. Water heater appliance 100 includes a casing 102. A tank 101 (FIG. 2) and heating elements 103 (FIG. 2) are positioned within casing 102 for heating water therein. Heating elements 103 may include a gas burner, a heat pump, an electric resistance element, a microwave element, an induction element, or any other suitable heating element or combination thereof. As will be understood by those skilled in the art and as used herein, the term "water" includes purified water and solutions or mixtures containing water and, e.g., elements (such as calcium, chlorine, and fluorine), salts, bacteria, nitrates, organics, and other chemical compounds or substances.

Water heater appliance 100 also includes a cold water conduit 104 and a hot water conduit 106 that are both in fluid communication with a chamber 111 (FIG. 2) defined by tank 101 within tank 101. As an example, cold water from a water source, e.g., a municipal water supply or a well, can enter water heater appliance 100 through cold water conduit 104 (shown schematically with arrow labeled $F_{cool}$ in FIG. 2). From cold water conduit 104, such cold water can enter chamber 111 of tank 101 wherein it is heated with heating elements 103 to generate heated water. Such heated water can exit water heater appliance 100 at hot water conduit 106 and be supplied to an end use point, e.g., such as a bath, shower, sink, or any other suitable feature.

Water heater appliance 100 extends longitudinally between a top portion 108 and a bottom portion 109 along a vertical direction V. Thus, water heater appliance 100 is generally vertically oriented. Water heater appliance 100 can be leveled, e.g., such that casing 102 is plumb in the vertical direction V, in order to facilitate proper operation of water heater appliance 100. It should be understood that water heater appliance 100 is provided by way of example only and that the present subject matter may be used with any suitable water heater appliance.

Figure 2:
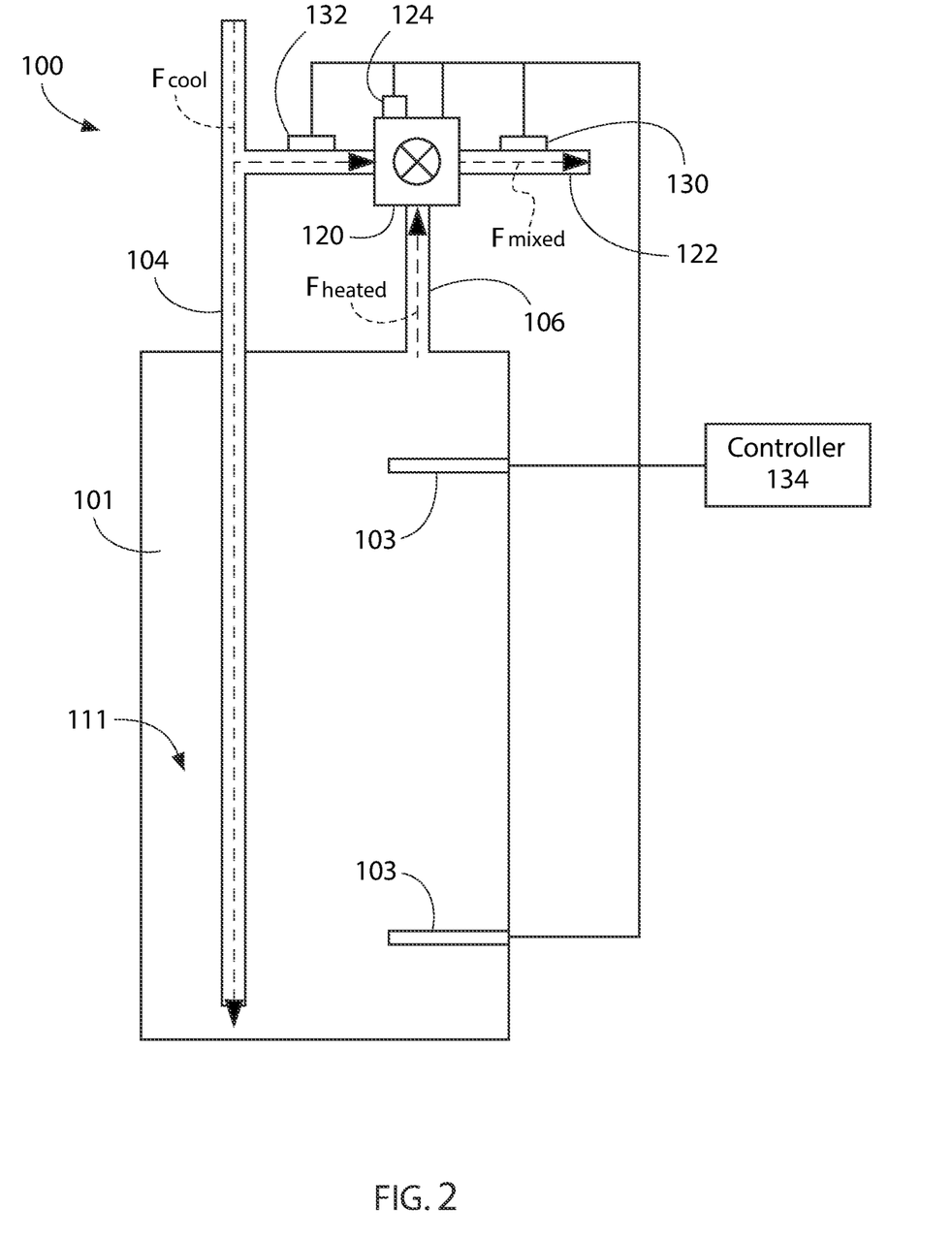
FIG. 2 provides a schematic view of certain components of the exemplary water heater appliance of FIG. 1.

FIG. 2 provides a schematic view of certain components of water heater appliance 100. As may be seen in FIG. 2, water heater appliance 100 includes a mixing valve 120 and a mixed water conduit 122. Mixing valve 120 is in fluid communication with cold water conduit 104, hot water conduit 106, and mixed water conduit 122. As discussed in greater detail below, mixing valve 120 is configured for selectively directing water from cold water conduit 104 and hot water conduit 106 into mixed water conduit 122 in order to regulate a temperature of water within mixed water conduit 122.

As an example, mixing valve 120 can selectively adjust between a first position and a second position. In the first position, mixing valve 120 can permit a first flow rate of relatively cool water from cold water conduit 104 (shown schematically with arrow labeled $F_{cool}$ in FIG. 2) into mixed water conduit 122 and mixing valve 120 can also permit a first flow rate of relatively hot water from hot water conduit 106 (shown schematically with arrow labeled $F_{heated}$ in FIG. 2) into mixed water conduit 122. In such a manner, water within mixed water conduit 122 (shown schematically with arrow labeled $F_{mixed}$ in FIG. 2) can have a first particular temperature when mixing valve 120 is in the first position. Similarly, mixing valve 120 can permit a second flow rate of relatively cool water from cold water conduit 104 into mixed water conduit 122 and mixing valve 120 can also permit a second flow rate of relatively hot water from hot water conduit 106 into mixed water conduit 122 in the second position. The first and second flow rates of the relatively cool water and relatively hot water are different such that water within mixed water conduit 122 can have a second particular temperature when mixing valve 120 is in the second position. In such a manner, mixing valve 120 can regulate the temperature of water within mixed water conduit 122 and adjust the temperature of water within mixed water conduit 122 between the first and second particular temperatures.

It should be understood that, in certain exemplary embodiments, mixing valve 120 is adjustable between more positions than the first and second positions. In particular, mixing valve 120 may be adjustable between any suitable number of positions in alternative exemplary embodiments. For example, mixing valve 120 may be infinitely adjustable in order to permit fine-tuning of the temperature of water within mixed water conduit 122.

Water heater appliance 100 also includes a position sensor 124. Position sensor 124 is configured for determining a position of mixing valve 120. Position sensor 124 can monitor the position of mixing valve 120 in order to assist with regulating the temperature of water within mixed water conduit 122. For example, position sensor 124 can determine when mixing valve 120 is in the first position or the second position in order to ensure that mixing valve 120 is properly or suitably positioned depending upon the temperature of water within mixed water conduit 122 desired or selected. Thus, position sensor 124 can provide feedback regarding the status or position of mixing valve 120.

It should be understood that in alternative exemplary embodiments, water heater appliance 100 need not include mixed water conduit 122. In such exemplary embodiments, mixing valve 120 can direct water into hot water conduit 106 in order to regulate a temperature of water within hot water conduit 106.

Water heater appliance 100 also includes a mixed water conduit temperature sensor or first temperature sensor 130 and a cold water conduit temperature sensor or second temperature sensor 132. First temperature sensor 130 is positioned on or proximate mixed water conduit 122 and is configured for measuring a temperature of water within mixed water conduit 122. First temperature sensor 130 is also positioned downstream of mixing valve 120. Second temperature sensor 132 is positioned on or proximate cold water conduit 104 and is configured for measuring a temperature of water within cold water conduit 104. Second temperature sensor 132 is positioned upstream of mixing valve 120. In certain exemplary embodiments, first temperature sensor 130 and/or second temperature sensor 132 may be positioned proximate or adjacent mixing valve 120.

Water heater appliance 100 further includes a controller 134 that is configured for regulating operation of water heater appliance 100. Controller 134 is in, e.g., operative, communication with heating elements 103, mixing valve 120, position sensor 124, and first and second temperature sensors 130 and 132. Thus, controller 134 can selectively activate heating elements 103 in order to heat water within chamber 111 of tank 101. Similarly, controller 134 can selectively operate mixing valve 120 in order to adjust a position of mixing valve 120 and regulate a temperature of water within mixed water conduit 122.

Controller 134 includes memory and one or more processing devices such as microprocessors, CPUs or the like, such as general or special purpose microprocessors operable to execute programming instructions or micro-control code associated with operation of water heater appliance 100. The memory can represent random access memory such as DRAM, or read only memory such as ROM or FLASH. The processor executes programming instructions stored in the memory. The memory can be a separate component from the processor or can be included onboard within the processor. Alternatively, controller 134 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 134 can be positioned at a variety of locations. In the exemplary embodiment shown in FIG. 1, controller 134 is positioned within water heater appliance 100, e.g., as an integral component of water heater appliance 100. In alternative exemplary embodiments, controller 134 may positioned away from water heater appliance 100 and communicate with water heater appliance 100 over a wireless connection or any other suitable connection, such as a wired connection.

Controller 134 can operate heating elements 103 to heat water within chamber 111 of tank 101. As an example, a user can select or establish a set-point temperature for water within chamber 111 of tank 101, or the set-point temperature for water within chamber 111 of tank 101 may be a default value. Based upon the set-point temperature for water within chamber 111 of tank 101, controller 134 can selectively activate heating elements 103 in order to heat water within chamber 111 of tank 101 to the set-point temperature for water within chamber 111 of tank 101. The set-point temperature for water within chamber 111 of tank 101 can be any suitable temperature. For example, the set-point temperature for water within chamber 111 of tank 101 may be between about one hundred and forty degrees Fahrenheit and about one hundred and eighty-degrees Fahrenheit.

Controller 134 can also operate mixing valve 120 to regulate the temperature of water within mixed water conduit 122. For example, controller 134 can adjust the position of mixing valve 120 in order to regulate the temperature of water within mixed water conduit 122. As an example, a user can select or establish a set-point temperature of mixing valve 120, or the set-point temperature of mixing valve 120 may be a default value. Based upon the set-point temperature of mixing valve 120, controller 134 can adjust the position of mixing valve 120 in order to change or tweak a ratio of relatively cool water flowing into mixed water conduit 122 from cold water conduit 104 and relatively hot water flowing into mixed water conduit 122 from hot water conduit 106. In such a manner, controller 134 can regulate the temperature of water within mixed water conduit 122.

The set-point temperature of mixing valve 120 can be any suitable temperature. For example, the set-point temperature of mixing valve 120 may be between about one hundred degrees Fahrenheit and about one hundred and twenty degrees Fahrenheit. In particular, the set-point temperature of mixing valve 120 may be selected such that the set-point temperature of mixing valve 120 is less than the set-point temperature for water within chamber 111 of tank 101. In such a manner, mixing valve 120 can utilize water from cold water conduit 104 and hot water conduit 106 to regulate the temperature of water within mixed water conduit 122.

In various embodiments, the water heater appliance 100, e.g., the controller 134 thereof, may be configured for detecting the start of a flow event, e.g., when water is drawn from the tank 101 to be supplied to an end user, such as another appliance, e.g., a dishwasher or clothes washing machine, or a fixture, e.g., a faucet or showerhead, etc. In some embodiments, for example, the water heater appliance 100 may include a flow meter positioned and configured to detect a flow event in and through the mixed water conduit 122 in order to detect the start of the flow event, e.g., where the flow meter communicates with the controller 134 such that the controller 134 may detect the start of the flow event based on a signal received from the flow meter.

In additional embodiments, the controller 134 may be configured to detect the start of the flow event based on a change in temperature in one or more of the cold water conduit 104, the hot water conduit 106, and/or the mixed water conduit 122. For example, when water is not flowing from the tank 101, heat from the tank 101, the hot water conduit 106, and/or water in the tank 101 and conduit 106 may travel, e.g., be conducted, to the cold water conduit 104 and/or relatively cold water therein. Thus, when water is not flowing from the tank 101 and/or through the mixed water conduit 122, the temperature sensed or monitored by the second temperature sensor 132 may slowly increase over time. For similar reasons, the temperature in or of the mixed water conduit 122 sensed or monitored by the first temperature sensor 130 may also slowly increase over time when there is no outflow from the water heater appliance 100. When water is then drawn from the tank 101 and through the mixed water conduit 122, the temperature in or of the cold water conduit 104 upstream of the mixing valve 120 will decrease over time as relatively cold water from the water supply flushes out and replaces the water which was warmed in the cold water conduit 104 while the water heater appliance 100 was idle (i.e., "idle" meaning not supplying water to the downstream plumbing system and fixtures connected thereto via the mixed water conduit 122). Similarly, the temperature in the mixed water conduit 122 may also decrease when a flow starts after an extended idle period. In particular, the temperature(s) may rise slowly while the water heater appliance 100 is idle, whereas the temperature (s) will drop more quickly at the beginning of the flow, such that the beginning or start of a flow event may be detected based on a drop in temperature or based on an increase in the rate of change in temperature over time, or both.

Figure 3:
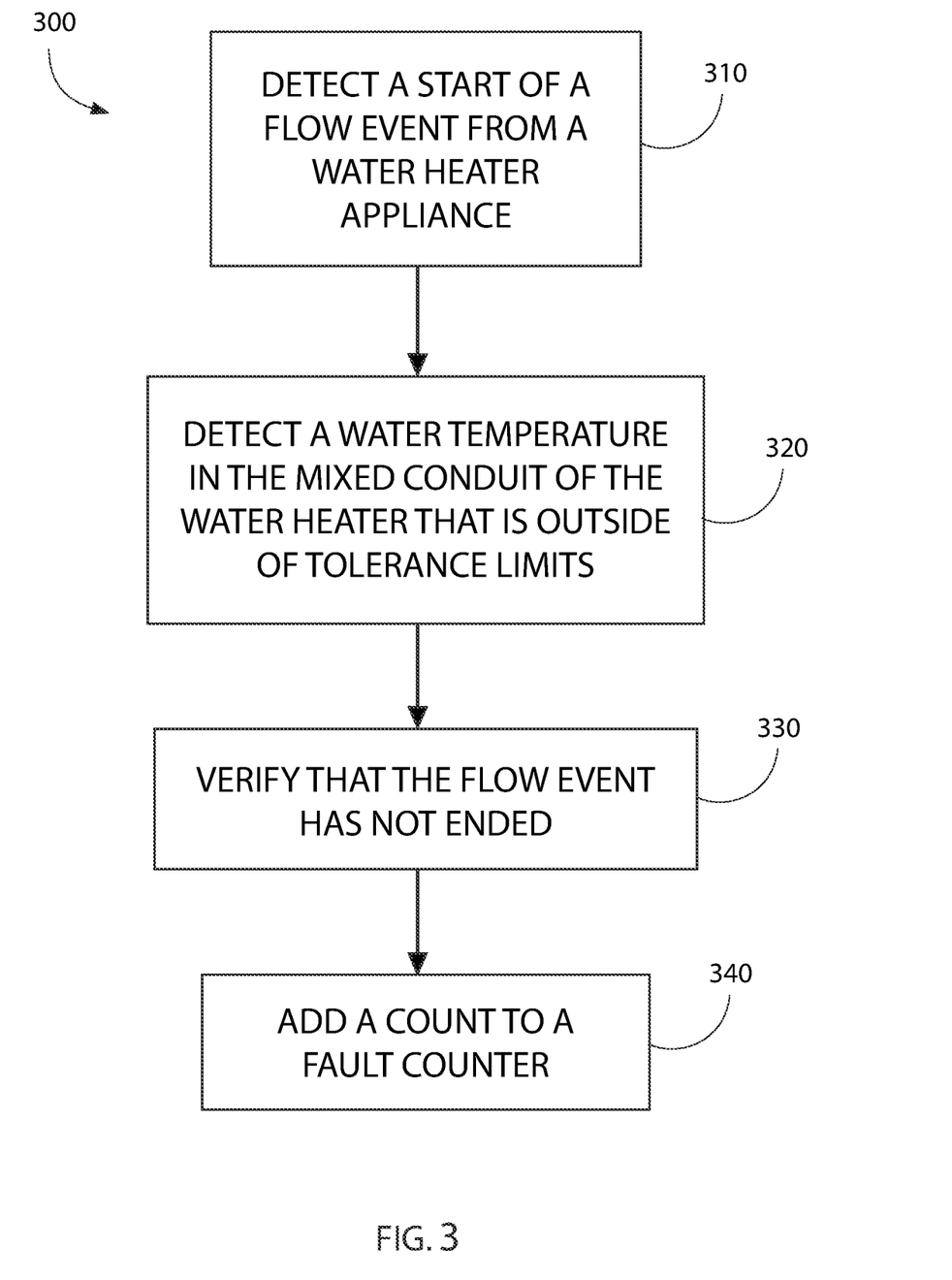
FIG. 3 illustrates a method for operating a water heater appliance according to one or more exemplary embodiments of the present subject matter.

FIG. 3 illustrates a method 300 for operating a water heater appliance according to an exemplary embodiment of the present subject matter. Method 300 can be used to operate any suitable water heater appliance. For example, method 300 may be utilized to operate water heater appliance 100 (FIG. 1). Controller 134 of water heater appliance 100 may be programmed to implement method 300.

In some embodiments, method 300 may include preliminary steps and/or be preceded by steps of a separate operation which include adjusting the mixing valve 120 to a default position, e.g., when water is not flowing through mixed water conduit 122. Controller 134 can adjust mixing valve 120 by signaling or commanding the mixing valve 120 to adjust to the default position. To ensure that mixing valve 120 is in the default position or to monitor mixing valve 120, controller 134 can receive a signal from position sensor 124 when mixing valve 120 shifts to the default position.

The default position of mixing valve 120 may correspond to a position of mixing valve 120 where the temperature of water within chamber 111 of tank 101 is about the set-point temperature for water within chamber 111 of tank 101 and the temperature of water within mixed water conduit 122 is about the set-point temperature of mixing valve 120 when water is flowing through mixed water conduit 122. Thus, controller 134 can determine or establish the default position for mixing valve 120 based upon the position of mixing valve 120 when water within chamber 111 of tank 101 is heated by heating elements 103 to about the set-point temperature and the temperature of water flowing through mixed water conduit 122 is about the set-point temperature of mixing valve 120.

As may be seen in FIG. 3, at step 310, controller 134 may be configured for and/or method 300 may include detecting a start of a flow event from the water heater appliance. As described above, in various embodiments, the start of the flow event may be detected based on a measured flow event, e.g., by a flow meter, or based on changes in measured temperatures from the first and/or second temperature sensors 130 and/or 132.

As illustrated at step 320 in FIG. 3, the method 300 may then include (and the controller 134 may be configured for) detecting a water temperature in the mixed water conduit of the water heater that is outside of tolerance limits after detecting the start of the flow event. As an example, controller 134 can receive multiple temperature measurements from first temperature sensor 130 at step 320. In particular, controller 134 can receive a first temperature measurement from first temperature sensor 130. After receiving the first temperature measurement, controller 134 can also receive a second temperature measurement from first temperature sensor 130. Based at least in part upon the first and second temperature measurements, controller 134 can compare a temperature error, e.g., an absolute temperature error, of mixing valve 120 to a predetermined error threshold, where the predetermined error threshold is an embodiment of the tolerance limits. If the temperature error of mixing valve 120 is greater than the predetermined error threshold, controller 134 can establish that the temperature of water within mixed water conduit 122 is unstable and/or outside of the tolerance limits. The temperature error can correspond to a difference between the temperature of water within mixed water conduit 122, e.g., as measured with first temperature sensor 130, and the set-point temperature of mixing valve 120.

As illustrated at step 330 in FIG. 3, the method 300 may then include (and the controller 134 may be configured for) verifying that the flow event has not ended after detecting the water temperature in the mixed water conduit is outside of the tolerance limits. For example, in some instances the water temperature in the mixed water conduit being outside of the tolerance limits may indicate a fault in the mixing valve 120, e.g., the mixing valve 120 may be stuck in a position which provides too much (or too little) of the relatively cold water from the cold water conduit 104 to the mixed water conduit 122, or the position of the mixing valve 122 may not be accurately reported to the controller 134, such that the mixing valve 120 is providing more (or less) cold water to the mixed water conduit 122 than expected.

However, in other instances, the apparent error, e.g., the water temperature in the mixed water conduit 122 that is outside of tolerance limits may be due to the flow from the water heater appliance 100 ending rather than an actual fault in the mixing valve 120. Thus, the method 300 may include and/or the controller 134 may be configured for verifying whether the flow event has ended in order to avoid or reduce false positive error detections.

In some embodiments, verifying that the flow event has not ended after detecting the water temperature in the mixed water conduit 122 is outside of the tolerance limits may include setting the mixing valve 120 of the water heater appliance 100 to a known position, such as full cold. With the mixing valve 120 in the known position, the controller 134 may then look for an expected temperature response based on the known position. For example, the controller may look for the expected temperature response by measuring the water temperature in the mixed water conduit 122 (e.g., with the first temperature sensor 130) after setting the mixing valve 120 of the water heater appliance 100 to the known setting, e.g., full cold. In at least some embodiments, the expected temperature response with the mixing valve 120 at the full cold setting may be a temperature less than the mixing valve set-point, such as a temperature less than the mixing valve set-point by at least a predetermined minimum amount. Thus, the stop of verifying that the flow event has not ended may include verifying the flow event has not ended because the measured water temperature in the mixed water conduit 122 after setting the mixing valve 120 to full cold is less than a set-point, e.g., is less than the mixing valve set-point.

In other embodiments, verifying that the flow event has not ended may include verifying the flow event has not ended because the measured water temperature in the mixed water conduit 122 after setting the mixing valve 120 to full cold is less than the tank set-point (where the tank set-point is greater than the mixing valve set-point), e.g., the temperature in the mixed water conduit 122 being less than the temperature within the tank 101 and/or less than the tank set-point may indicate that the mixed water conduit 122 is receiving water from the cold water conduit 104 which is at a temperature less than the tank set-point, e.g., that the mixing valve 120 is in a cold position, such as the full cold position, and water is flowing through the mixing valve 120.

In some embodiments, the method 300 may further include allowing a wait time period to elapse after detecting the start of the subsequent flow event and before measuring the water temperature in the mixed water conduit 122 after setting the mixing valve 120 to full cold.

In some embodiments, verifying that the flow event has not ended because the measured water temperature in the mixed water conduit 122 after setting the mixing valve 120 to full cold is less than a set-point may include verifying that the flow event has not ended when the measured water temperature in the mixed water conduit 122 after setting the mixing valve 120 to full cold is closer to a supply temperature than to the set-point.

As illustrated at step 340 in FIG. 3, the method 300 may include (and the controller 134 may be configured for) adding a count to a fault counter after verifying that the flow event has not ended. For example, as discussed above, when water is flowing and the water temperature is not responding (or not responding accurately and appropriately) to changes in position of the mixing valve 120 as commanded or signaled by the controller 134, then the mixing valve 120 may be in a fault condition, e.g., stuck or miscalibrated.

In at least some embodiments, the method 300 may also include and/or the controller 134 may also be configured for taking additional steps to remediate or ameliorate the fault condition. For example, in some embodiments, such steps may be performed when the fault counter reaches a predetermined threshold, such as about five counts. The predetermined threshold may be between about three counts and about fifteen counts, such between about five counts and about ten counts, such as about five counts or about eight counts, etc. The remedial steps may include one or more of disabling the mixing valve, lowering the tank set-point, e.g., lowering the tank set-point to the mixing valve set-point, disabling controls of the water heater appliance 100, and/or calling for service. When the mixing valve 120 is disabled, the flow of water from the cold water conduit 104 may be closed off or obstructed by the mixing valve 120, such that the mixed water conduit 122 receives a direct and undiluted flow of water from the tank 101 and/or the hot water conduit 106. Thus, in at least some embodiments, the tank set-point may be lowered to the mixing valve set-point so that water is provided to the plumbing system downstream of the water heater appliance 100 at the desired or intended temperature, where the mixing valve set-point corresponds to the intended or desired final water temperature (e.g., after mixing) to be provided to the end user. Disabling controls of the water heater appliance 100 may include locking the tank set-point at the lowered value, e.g., at the mixing valve set-point. Calling for service may include one or more of providing a user notification via an interface of the water heater appliance 100 and/or providing a notification to a remote device, such as a computer, a smartphone, or a tablet, via a network. The user notification on the interface of the water heater appliance 100 may include an audible or visible notification, or both, e.g., a blinking light, a red light, a chime or beep, etc. The notification sent to the remote device may include a text message or SMS message, an email, or any other suitable notification, including combinations thereof.

Figure 4:
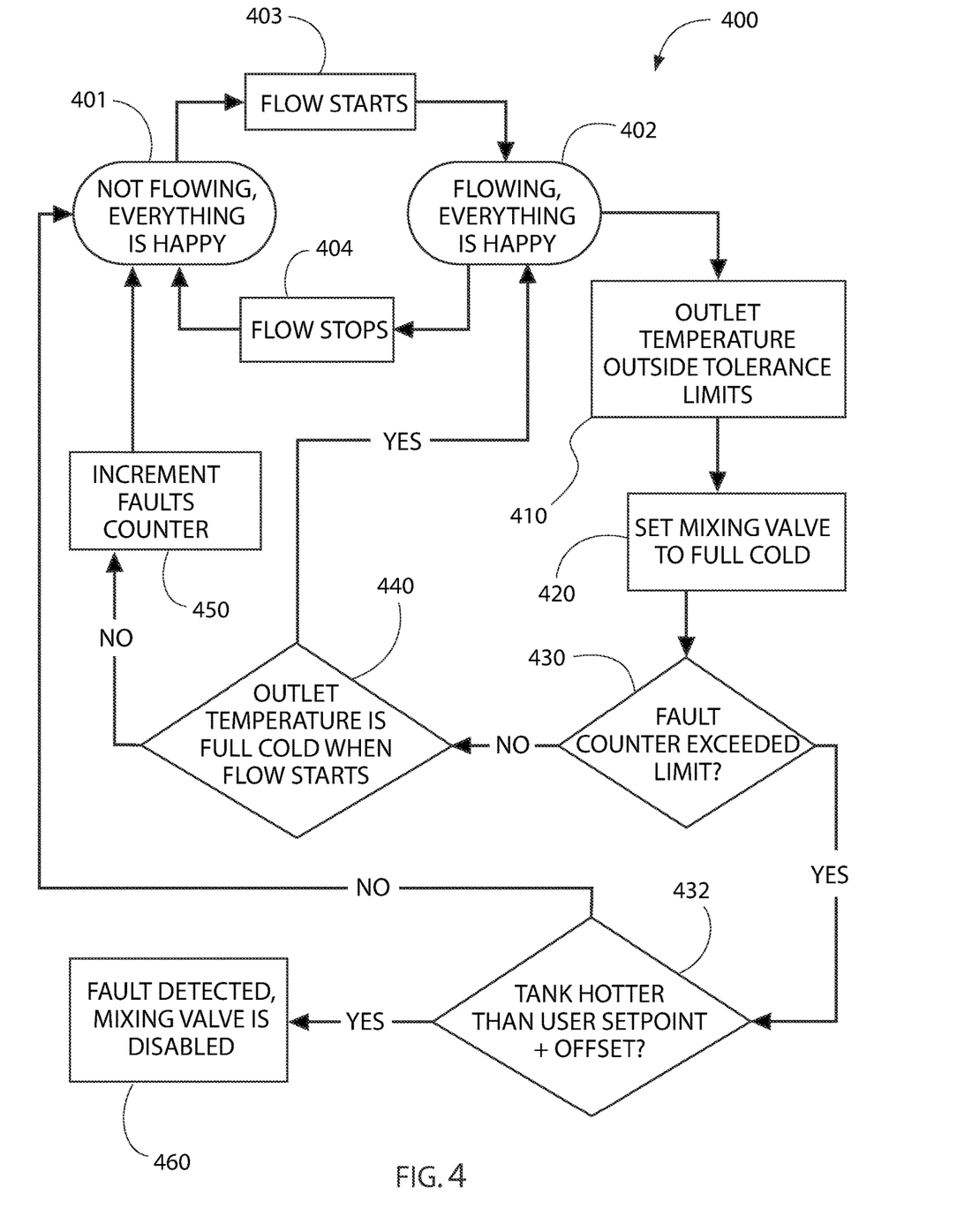
FIG. 4 illustrates another method for operating a water heater appliance according to one or more additional exemplary embodiments of the present subject matter.

Turning now to FIG. 4, an additional exemplary method 400 of operating a water heater appliance is illustrated. As with the exemplary method 300 illustrated in FIG. 3, the method 400 of FIG. 4 may also be used to operate any suitable water heater appliance, such as but not limited to the example water heater appliance 100 illustrated in FIGS. 1 and 2. The method 400 may begin at step 401 or 402, when water is not flowing from the water heater appliance at step 401 or when water is flowing at step 402. In either case, everything is happy at the beginning of the method 400 in either step 401 or 402. Everything being happy includes all systems and components of the water heater appliance functioning as intended within normal and expected operating parameters, e.g., the outlet temperature (the outlet temperature may be, e.g., the temperature of the water $F_{mixed}$ from the water heater appliance 100 via the mixed water conduit 122 as in FIG. 2) is at or within a tolerance range of the expected outlet temperature based on a current position of the mixing valve 120 and a current temperature or temperature set-point for water in the chamber 111 of the tank 101.

As illustrated in FIG. 4, the operation of the water heater appliance may also include switching between the states of steps 401 and 402, such as identifying a flow start at 403 and moving from 401 to 402 when a flow start is detected, such as when a parametric value for a parameter such as Flow State is true. Also as illustrated in FIG. 4, the method 400 may move from "flowing" at 402 to "not flowing" at 401 when a flow stop is detected, e.g., as indicated at 404 in FIG. 4. In some embodiments, the flow stop may be detected when the parametric value for the Flow State is false. Thus, the method 400 may generally include monitoring the status of the water heater appliance, such as monitoring flow status including starts and stops, as illustrated in FIG. 4 at 401, 402, 403, and 404.

In some embodiments, during the flowing status indicated at 402 in FIG. 4, the outlet temperature may be outside of predetermined tolerance limits, as illustrated at 410 in FIG. 4. When the outlet temperature is outside of the tolerance limits, this may indicate a fault, or the outlet temperature outside of the tolerance limits may simply mean that an end of flow or flow stop 404 was missed. In response to the outlet temperature outside the tolerance limits at step 410, the method 400 may then include a step 420 of setting the mixing valve to a full cold position, wherein water is supplied to the mixed water conduit 122 via the mixing valve 120 exclusively from the cold water conduit 104 and wherein the mixing valve 120 (when the mixing valve 120 is operating as intended) prevents or obstructs flow from the chamber 111 of the tank 101 to the mixed water conduit 122.

The method 400 may then proceed to a step 430 of checking whether a fault counter has exceeded a limit. When the fault counter has not exceeded the limit, e.g., when the determination at 430 in FIG. 4 is "NO," the method 400 then waits until a flow start is detected and checks whether the outlet temperature is full cold when the flow starts, as indicated at 440 in FIG. 4. When the outlet temperature is full cold when the flow starts, e.g., when 440 leads to "YES" in FIG. 4, the method 400 returns to state 402, indicating that water is flowing from the water heater appliance and everything is happy, e.g., the water heater appliance, including the mixing valve thereof, is operating as intended.

When the outlet temperature is not full cold when the flow starts, e.g., when 440 leads to "NO" in FIG. 4, the method 400 increments the fault counter, as illustrated for example at step 450 in FIG. 4. Because the fault counter had not exceeded the limit at step 430, the method 400 then returns to state 401, assuming that the outlet temperature, e.g., the temperature within the mixed conduit 122, was not full cold due to heat from the hot water conduit 106 and/or water therein being conducted to the mixed water conduit 122 and/or water therein while the water heater appliance 100 was idle, i.e., not flowing, as described above in the context of detecting the start of flow based on a change in temperature. That is, when the fault counter has not exceeded the limit at 430 but the outlet temperature is not full cold at 440, the method 400 may attribute the outlet temperature to a missed flow stop rather than a failed valve.

When the fault counter has exceeded the limit, e.g., when the determination at 430 in FIG. 4 is "YES," the method 400 may then, optionally, check the temperature of water within the tank, e.g., within the chamber 111 of tank 101 in FIG. 2, as indicated at step 432, where the tank temperature is compared to the user-selected set point temperature plus an offset. The offset may be a small offset, such as about 10% of the user-selected set point temperature or less, such as about 5% of the user-selected set point temperature or less, or about ten degrees Fahrenheit (10° F.) or less, such as about five degrees Fahrenheit (5° F.) or less. The tank temperature check illustrated at 432 in FIG. 4 may serve to avoid or reduce false positives, e.g., as illustrated in FIG. 4, when the fault counter has exceeded the limit at 430 but the tank is cool, e.g., is not hotter than the user-selected set point temperature plus the offset at step 432, the method 400 may then return to step 401, where water is not flowing from the water heater appliance and everything is happy. When the tank temperature is greater than the user-selected set point temperature plus the offset at step 432, e.g., following the "YES" branch from 432 in FIG. 4, a mixing valve fault is detected and, in response to the detected fault, the mixing valve may be shut down and/or disabled as illustrated at 460 in FIG. 4. For example, when the mixing valve is disabled, the tank temperature set point will be set to the desired outlet temperature and cold water from the cold water conduit 104 will not be directed into the mixed water conduit 122 via the mixing valve 120.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents. For example, some or all of the various steps of methods 300 and 400 may be provided in additional combinations or sequences other than the illustrated example combinations and sequences in FIGS. 3 and 4. As but one possible example, method 400 may omit the step 432 and proceed directly to detecting the fault at step 460 when the outlet temperature is outside the tolerance limits and the fault counter has exceeded the limit at step 430.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a water heater appliance, the water heater appliance comprising a cold water conduit providing a flow of water to the water heater appliance, a hot water conduit providing a flow of water from the water heater appliance, a mixing valve in direct fluid communication with the cold water conduit and the hot water conduit, and a mixed water conduit downstream of the mixing valve, the method comprising:
   detecting a start of a flow event from the water heater appliance;
   detecting a water temperature in the mixed water conduit of the water heater that is outside of tolerance limits after detecting the start of the flow event;
   verifying that the flow event has not ended after detecting the water temperature in the mixed water conduit is outside of the tolerance limits by setting the mixing valve of the water heater appliance to full cold, measuring the water temperature in the mixed water conduit after setting the mixing valve of the water heater appliance to full cold, and verifying that the flow event has not ended because the measured water temperature in the mixed water conduit after setting the mixing valve of the water heater appliance to full cold is less than a set-point; and
   adding a count to a fault counter after verifying that the flow event has not ended.

2. The method of claim 1, further comprising turning off water flow from the water heater appliance after setting the mixing valve of the water heater appliance to full cold and detecting a start of a subsequent flow event before measuring the water temperature in the mixed water conduit after setting the mixing valve of the water heater appliance to full cold.

3. The method of claim 2, further comprising allowing a wait time period to elapse after detecting the start of the subsequent flow event and before measuring the water temperature in the mixed water conduit after setting the mixing valve of the water heater appliance to full cold.

4. The method of claim 1, wherein the set-point is a tank set-point and the tank set-point is greater than a mixing valve set-point.

5. The method of claim 1, wherein verifying that the flow event has not ended because the measured water temperature in the mixed water conduit after setting the mixing valve of the water heater appliance to full cold is less than a set-point comprises verifying that the flow event has not ended when the measured water temperature in the mixed water conduit after setting the mixing valve of the water heater appliance to full cold is closer to a supply temperature than to the set-point.

6. The method of claim 1, further comprising disabling the mixing valve of the water heater appliance after the fault counter reaches five.

7. The method of claim 1, wherein the start of the flow event is detected based on a rate of change in water temperature upstream of the mixing valve of the water heater appliance.

8. The method of claim 1, wherein the start of the flow event is detected by a flow meter of the water heater appliance.

9. A water heater appliance, comprising:
   a cold water conduit providing a flow of water to the water heater appliance;
   a hot water conduit providing a flow of water from the water heater appliance;
   a mixing valve in direct fluid communication with the cold water conduit and the hot water conduit;
   a mixed water conduit downstream of the mixing valve; and
   a controller, the controller configured for:
      detecting a start of a flow event from the water heater appliance;
      detecting a water temperature in the mixed water conduit of the water heater that is outside of tolerance limits after detecting the start of the flow event;
      verifying that the flow event has not ended after detecting the water temperature in the mixed water conduit is outside of the tolerance limits by setting the mixing valve of the water heater appliance to full cold, measuring the water temperature in the mixed water conduit after setting the mixing valve of the water heater appliance to full cold, and verifying that the flow event has not ended because the measured water temperature in the mixed water conduit after setting the mixing valve of the water heater appliance to full cold is less than a set-point; and
      adding a count to a fault counter after verifying that the flow event has not ended.

10. The water heater appliance of claim 9, wherein the controller is further configured for turning off water flow from the water heater appliance after setting the mixing valve of the water heater appliance to full cold and detecting a start of a subsequent flow event before measuring the water temperature in the mixed water conduit after setting the mixing valve of the water heater appliance to full cold.

11. The water heater appliance of claim 10, wherein the controller is further configured for allowing a wait time period to elapse after detecting the start of the subsequent flow event and before measuring the water temperature in the mixed water conduit after setting the mixing valve of the water heater appliance to full cold.

12. The water heater appliance of claim 9, wherein the set-point is a tank set-point and the tank set-point is greater than a point of use set-point.

13. The water heater appliance of claim 9, wherein the controller is configured for verifying that the flow event has not ended because the measured water temperature in the mixed water conduit after setting the mixing valve of the water heater appliance to full cold is less than a set-point by verifying that the flow event has not ended when the measured water temperature in the mixed water conduit after setting the mixing valve of the water heater appliance to full cold is closer to a supply temperature than to the set-point.

14. The water heater appliance of claim 9, wherein the controller is further configured for disabling the mixing valve of the water heater appliance after the fault counter reaches five.

15. The water heater appliance of claim 9, further comprising a temperature sensor upstream of the mixing valve, wherein the start of the flow event is detected based on a rate of change in water temperature upstream of the mixing valve of the water heater appliance.

16. The water heater appliance of claim 9, further comprising a flow meter, wherein the start of the flow event is detected by the flow meter.

\* \* \* \* \*